United States Patent [19]

Moore

[11] 4,239,386
[45] Dec. 16, 1980

[54] PRINTING TRANSPARENCIES
[75] Inventor: Michael H. Moore, Ilford, England
[73] Assignee: Ciba-Geigy AG, Basel, Switzerland
[21] Appl. No.: 65,692
[22] Filed: Aug. 10, 1979
[30] Foreign Application Priority Data
Aug. 10, 1978 [GB] United Kingdom ............... 32879/78
[51] Int. Cl.³ ....................... G03B 27/44; G03B 27/04
[52] U.S. Cl. ........................................ 355/77; 355/46; 355/127
[58] Field of Search ..................... 355/74, 77, 125, 46, 355/131–133, 72, 114, 123, 122, 127; 354/110, 120, 125

[56] References Cited

U.S. PATENT DOCUMENTS

| | | | |
|---|---|---|---|
| 1,543,065 | 6/1925 | Douglass | 354/125 |
| 2,654,289 | 10/1953 | Flynn | 355/74 X |
| 2,834,273 | 5/1958 | Bartilotta | 355/114 X |
| 2,857,830 | 10/1958 | Cohen | 355/123 |
| 2,943,553 | 7/1960 | Drewett | 355/123 |
| 3,677,638 | 7/1972 | Daugherty | 355/74 |
| 3,750,541 | 8/1973 | Jason | 355/46 |
| 4,115,002 | 9/1978 | Clark | 355/77 X |

FOREIGN PATENT DOCUMENTS

| | | | |
|---|---|---|---|
| 1097272 | 1/1961 | Fed. Rep. of Germany | 355/127 |
| 201032 | 7/1923 | United Kingdom | 355/127 |
| 1105328 | 3/1968 | United Kingdom | 355/132 |
| 1372857 | 11/1974 | United Kingdom | 355/127 |

*Primary Examiner*—Donald A. Griffin
*Attorney, Agent, or Firm*—Harry Falber

[57] ABSTRACT

For printing transparencies frames are used which, either by means of their framework or of the borders of transparencies mounted thereon, mask areas which are greater than those of the transparencies. A first frame loaded with a first set of mounted transparencies is placed over a sheet of print material and a first exposure is made. The first frame is removed and a second frame loaded with a second set of mounted transparencies is placed over the same sheet of print material in such a position that the transparencies mounted thereon are in alignment with those areas which were masked previously by the first frame. Then a second exposure is made.

4 Claims, 5 Drawing Figures

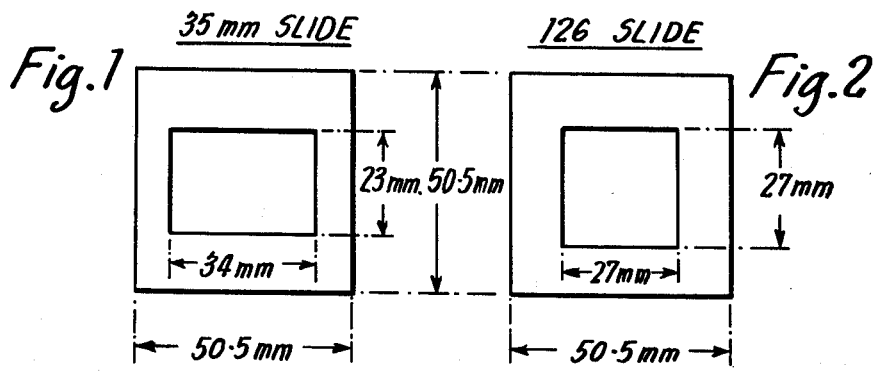
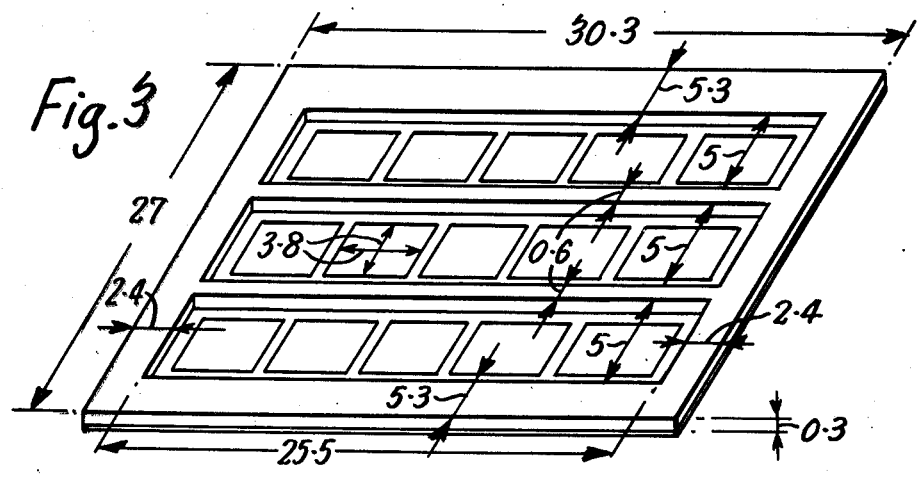
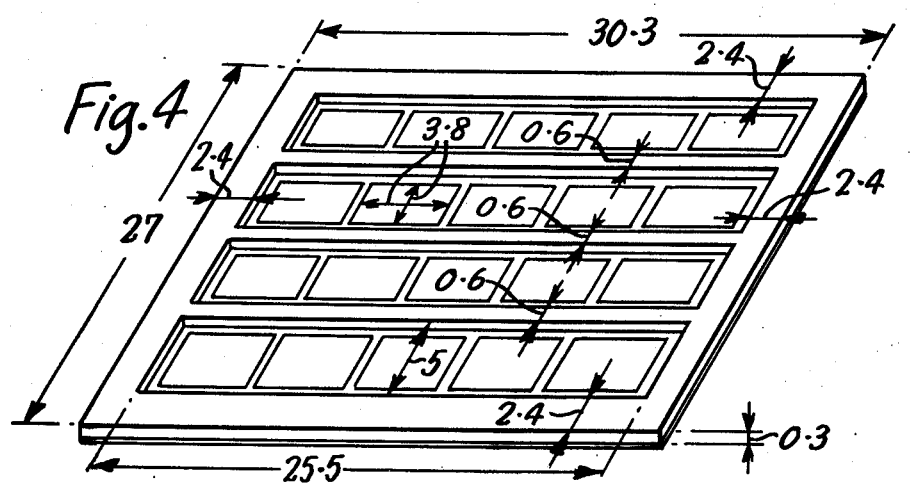

PRINTING TRANSPARENCIES

This invention relates to the printing of a set of mounted transparencies on to print material.

It is the object of the present invention to provide a method of printing a set of transparencies on to print material in which greater use is made of the available print material.

Therefore according to the present invention there is provided a method of printing a set of mounted transparencies which comprises placing in a predetermined manner a first frame loaded with a first set of mounted transparencies over a sheet of print material and effecting a first exposure, taking up the said first frame and placing in a predetermined manner a second frame loaded with a second set of mounted transparencies over the same sheet of print material and effecting a second exposure, the said second frame being so constructed that each of the mounted transparencies when loaded thereon and placed over the print material is over an area thereof which is masked during the first exposure either by the borders of the mounts of the first set of mounted transparencies or by the framework of the frame and the areas of the print material which are exposed during the first exposure are masked during the second exposure by the borders of the mounts of the second set of transparencies or by the framework of the said second frame.

Preferably the print material is held under the exposure means in the bottom of a retaining frame there being means on the retaining frame for locating the said first and second frame in a predetermined manner during the first and second exposures.

In a modification of the method of the present invention when the amount of print material masked by the mounts of the transparencies during the exposure is great it is possible to employ a third frame loaded with mounted transparencies and to employ a third exposure in the same manner as the second frame. This is the practical limit for normal transparencies, that is to say 35 mm transparencies. If however the transparencies were very much smaller but the mounts were substantially of the same size as the mounts used for 35 mm transparencies then it would be possible and even desirable to employ a fourth and even a fifth frame in order to utilise all the available print material.

The accompanying drawings will serve to illustrate the invention.

FIG. 1 is a plan view of a mounted 35 mm transparency.

FIG. 2 is a plan view of a mounted 126 size transparency.

FIG. 3 is a perspective view of one frame used in the method of the present invention.

FIG. 4 is a perspective view of a second frame for use after the first frame in the method of the present invention.

FIGS. 1 and 2 show in cm the areas occupied by the transparencies and the areas occupied by the cardboard or plastic mounts. Only about ½ of the area of the whole is transparency.

Figure 5:
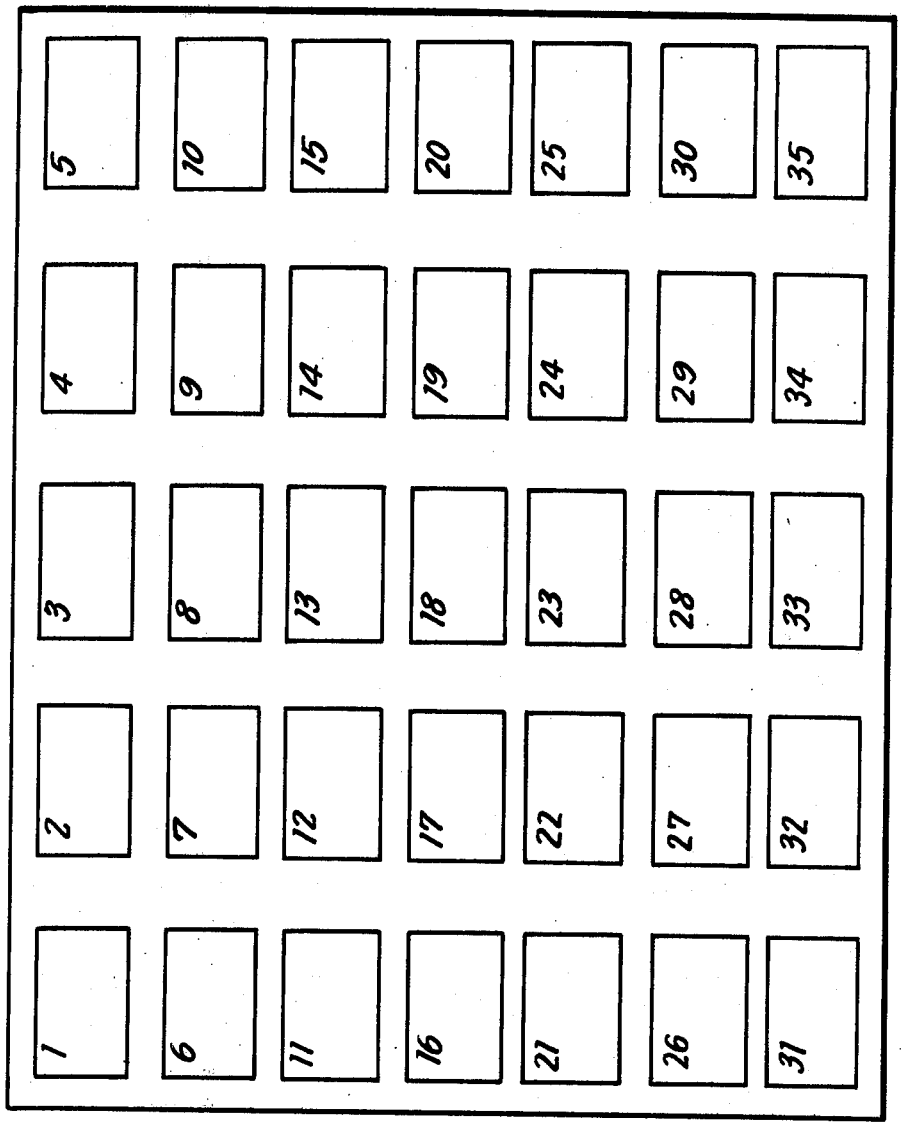
FIG. 5 is a plan view of a sheet of print material bearing 35 contact prints which has been made using the method of the present invention and the two frames of FIGS. 3 and 4.

FIGS. 3 and 4 show in mm the dimensions of two frames which can be used together in the method of the present invention. FIG. 3 shows a frame into which fifteen transparencies of either FIGS. 1 or 2 can be mounted. The area of each of the 15 apertures is 3.8 cm$^2$. FIG. 4 shows a frame to be used in combination with the frame of FIG. 3. Twenty transparencies of either FIG. 1 or FIG. 2 can be mounted in this frame. The area of each aperture is also 3.8 cm$^2$.

FIG. 5 shows the location of the thirty-five contact prints obtained by use of the frames of FIGS. 3 and 4.

In carrying out the method of the present invention a sheet of colour print material 20.3 × 25.4 cm is located in a frame beneath an enlarger. The frame of FIG. 3 is then located in the frame over the sheet of print material. The print material is then exposed to light through the frame of FIG. 3. The frame of FIG. 3 is then removed and replaced by the frame of FIG. 4 and the print material is again exposed to light. The frame is removed and the print material is subjected to a colour processing sequence to form the contact prints. Sharply focussed colour prints are obtained even though there is no optical contact between the print material and the transparencies during the exposure sequences. A special retaining frame may be employed which locates correctly both the print material and the two frames.

Thus by the use of the method of the present invention it is possible to obtain 35 contact prints on one piece of expensive print material 20.3 × 25.4 cm. If the mounted transparencies had been laid side by side on the print material and subjected to one exposure only fifteen to twenty transparencies could have been laid on the print material.

As can be seen from FIG. 5 still only about half the available print material is occupied by contact prints. By use of three frames it is possible to use more of the print material but the registration problems then become difficult.

I claims:

1. A method of printing a set of mounted transparencies which comprises placing in a predetermined manner a first frame loaded with a first set of mounted transparencies over a sheet of print material and effecting a first exposure, taking up the said first frame and placing in a predetermined manner a second frame loaded with a second set of mounted transparencies over the same sheet of print material and effecting a second exposure, the said second frame being so constructed that each of the mounted transparencies when loaded thereon and placed over the print material is over an area thereof which is masked during the first exposure either by the borders of the mounts of the first set of mounted transparencies or by the framework of the frame and the areas of the print material which are exposed during the first exposure are masked during the second exposure by the borders of the mounts of the second set of transparencies or by the framework of the said second frame.

2. A method according to claim 1 wherein the print material is held under the exposure means in the bottom of a retaining frame there being means on the retaining frame for locating the said first and second frames in a predetermined manner during the first and second exposures.

3. A method according to either claim 1 or claim 2 wherein a third frame mounted with transparencies is used and a third exposure is employed.

4. A set of frames for carrying out the method as claimed in any one of claims 1 to 3.

* * * * *